United States Patent [19] [11] 4,113,721
Hauser et al. [45] Sep. 12, 1978

[54] WATER-SOLUBLE, NON-POLAR SOLVENT-SOLUBLE ETHYLENEOXY-PROPYLENEOXY CONTAINING FUGITIAL TINTS

[75] Inventors: Peter Jacob Hauser, Inman; Hans Heinrich Kuhn, Spartanburg, both of S.C.

[73] Assignee: Milliken Research Corporation, Spartanburg, S.C.

[21] Appl. No.: 815,122

[22] Filed: Jul. 13, 1977

Related U.S. Application Data

[63] Continuation of Ser. No. 609,369, Sep. 2, 1975, abandoned.

[51] Int. Cl.² .................. C09B 11/04; C09B 29/06; C09B 29/08; C09B 35/04
[52] U.S. Cl. .................. 260/178; 260/198; 260/207; 260/207.5; 260/389; 260/511; 260/573
[58] Field of Search .............. 260/198, 200, 205, 206, 260/207, 207.1, 207.5, 178, 389; 8/164

[56] References Cited

U.S. PATENT DOCUMENTS

| 3,022,335 | 2/1962 | Lundsted | 260/584 B X |
| 3,101,374 | 8/1963 | Patton | 260/584 B |
| 3,157,633 | 11/1964 | Kuhn | 260/200 |
| 3,206,511 | 9/1965 | Bindler et al. | 260/570.6 |
| 3,337,525 | 8/1967 | Peters et al. | 260/200 |
| 3,449,319 | 6/1969 | Kuhn | 260/207.5 |

FOREIGN PATENT DOCUMENTS 46-23,793  7/1971  Japan ........................... 8/164

Primary Examiner—Floyd D. Higel
Attorney, Agent, or Firm—William Petry; Glen M. Burdick

[57] ABSTRACT

A water-soluble, non-polar solvent-soluble fugitive tint for textile materials is provided having the formula

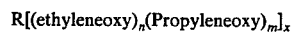

$R[(ethyleneoxy)_n(Propyleneoxy)_m]_x$ wherein R is an organic dyestuff radical, $[(ethyleneoxy)_n(Propyleneoxy)_m]$ is a polymer obtained by combining $n$ moles of ethylene oxide and $m$ moles of propylene oxide, $x$ is from 1 to 6, and said polymer contains from about 40 to 60 mole percent ethyleneoxy units, and the product $(n + m)_x$ is from 30 to about 200.

7 Claims, No Drawings

WATER-SOLUBLE, NON-POLAR SOLVENT-SOLUBLE ETHYLENEOXY-PROPYLENEOXY CONTAINING FUGITIAL TINTS

This application is a continuation of our copending application, Ser. No. 609,369, filed Sept. 2, 1975 now abandoned.

This invention relates to fugitive tints and to methods for their preparation. More particularly, this invention relates to fugitive tints which are fugitive with water as well as with non-polar solvents.

U.S. Pat. No. 3,157,633 describes novel water-soluble polymeric tints having one or more polyethyleneoxy chains covalently bound to a dyestuff molecule. These compounds are used extensively as fugitive tints in the textile industry and are easily removed from substantially all textile fibers by scouring with aqueous solutions.

Recently, a significant proportion of the knitted fabrics being produced have not been finished with aqueous solutions but only have been drycleaned with solvents before being manufactured into garments. Since polyethyleneoxy tints are not fugitive in drycleaning solvents such as tetrachloroethylene, it has been necessary to employ different tints for fabrics undergoing such treatments. However, no other tints have been available which can be easily removed during finishing under both aqueous and solvent conditions. This has complicated the problems of the fabric manufacturer since it must be known in advance how the resulting fabric is to be finished in order to select a compatible tint for the yarns being used. Otherwise, removal of the tint can involve extra or undesirable finishing operations.

The present invention provides a novel tint which not only is water-soluble but also is soluble in non-polar solvents and particularly non-polar chlorinated solvents such as tetrachloroethylene. Moreover, the tints of the present invention can be easily and completely removed from substantially all textile fibers by the aqueous or solvent scouring operations commonly used in fabric finishing.

The novel tints of the present invention comprise an organic dyestuff molecule having up to 6 mixed ethyleneoxy-propyleneoxy chains containing from 30 to about 200 oxy units. It is surprising that the tints of the invention are fugitive with both water and solvents in view of the fact that ethyleneoxy tints are only water fugitive and propyleneoxy tints are only solvent fugitive. Further, it is unexpected that this water and solvent fugitivity is achieved with the tints of the present invention irrespective of whether the relatively large dyestuff molecule is hydrophilic or hydrophobic.

The ethyleneoxy-propyleneoxy polymer chains of the tints of the invention may be alternating ethyleneoxy-propyleneoxy copolymers, block polymers thereof or graft polymers. Advantageously, the ethyleneoxy units comprise between about 40 and 60 mole percent of the chains with the propyleneoxy units being the remainder.

Important fugitive tints of the present invention are characterized by the general formula

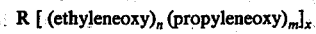

R [ (ethyleneoxy)$_n$ (propyleneoxy)$_m$]$_x$ where R is a dyestuff radical, x is 1 to 6, [(ethyleneoxy)$_n$ (propyleneoxy)$_m$] is a polymer chain obtained by combining n moles of ethylene oxide with m moles of propylene oxide, where the product of n plus m times x, (n + m)x, is 30 to about 200 and the ethyleneoxy units, e.g. n, comprise between about 40 to 60 mole percent of the polymer chain.

Preferred among the compounds of the above formula are those where R is attached by an amino nitrogen. Compounds contemplated within this general class are those where R is a nitroso, nitro, azo including monoazo, bisazo, and trisazo, diphenylmethane, triphenylmethane, xanthane, acridene, methine, thiazole, indamine, azine, oxazine, or anthraquinone dyestuff radicals. Preferred dyestuffs are the azo and triarylmethane dyes.

The water fugitivity of any particular class of the above described compounds is enhanced when the dyestuff radical contains at least one sulfonic acid radical and the more preferred tints of the invention have at least one neutralized sulfonic acid radical in the molecule, i.e., as an alkali metal or other solubilizing salt.

The tints of the invention may be prepared by converting a dyestuff intermediate containing a primary amino group into the corresponding ethyleneoxy-propyleneoxy polymer compound and employing the resulting compound to produce a compound having a chromophoric group in the molecule. In the case of azo dyestuffs, this may be accomplished by reacting a primary aromatic amine with an equimolar mixture of ethylene oxide and propylene oxide according to procedures well known in this art, and then coupling the resulting compound with a diazonium salt of an aromatic amine. In order to prepare fugitive tints of the triarylmethane class, aromatic amines that have been reacted as stated above with ethylene oxide and propylene oxide are condensed with aromatic aldehydes and the resulting condensation products oxidized to form the triarylmethane tints. While azo and triphenylmethane tints are preferred because of their ease of preparation and brilliance of color as well as the multitude of shades available, many other tints can be prepared by known procedures using N,N-disubstituted tertiary amines as starting materials.

The following preparations and examples are illustrations of various embodiments of the invention.

PREPARATION I

Ten pounds of N,N dihydroxyethyl-m-toluidine are reacted with a mixture of 136 pounds of ethylene oxide and 180 pounds of propylene oxide in the presence of potassium hydroxide following well-known ethoxylation procedures. About 50 molar equivalents each of ethylene oxide and propylene oxide are thus added to the starting material to produce a compound which is a liquid at room temperature.

PREPARATION II

The procedure of Preparation I is repeated employing N,N dihydroxyethyl-aniline and 50 molar equivalents each of ethylene oxide and propylene oxide to produce a compound which is a liquid at room temperature.

PREPARATION III

The procedure of Preparation I is repeated using N,N-dihydroxyethyl-2,5-dimethoxy-aniline and 25 molar equivalents each of ethylene oxide and propylene oxide to form a compound which is a liquid at room temperature.

Similarly, other aromatic primary amines, e.g., those having one or more chloro, nitro, lower alkyl and lower alkoxy substituents on an aromatic ring, with at least one unsubstituted position to permit coupling, can be converted to the corresponding polyethyleneoxy-polypropyleneoxy-tertiary amines using a total of from 30 to about 200 molar equivalents of ethylene oxide and propylene oxide with between 40 and 60 mole percent being ethylene oxide and the remainder propylene oxide.

The above compounds can be converted to fugitive tints of this invention according to the procedures described in the examples below.

EXAMPLE I

Sixty-eight pounds of a compound prepared according to Preparation I are dissolved in an equal amount of water and the resulting mixture added to a solution of 4 pounds of a diazonium salt of aniline 2,5 disulfonic acid monosodium salt at 0° C. Sufficient sodium acetate is added to keep the pH between 2 and 4. After the reaction is complete, the solution is neutralized with sodium bicarbonate. A solution of a yellow fugitive tint is obtained that can be isolated by evaporation of the water.

EXAMPLE II

The procedure of Example I is repeated employing the diazonium salt of aniline and the compound of Preparation I. A yellow fugitive tint is obtained.

EXAMPLE III

The procedure of Example I is repeated using the diazonium salt of 1,8 naphtholamine -3-6 disulfonic acid and the compound of Preparation I. A red fugitive tint is obtained.

EXAMPLE IV

The procedure of Example I is repeated employing the diazonium salt of aniline 2,5 disulfonic acid and the compound prepared according to Preparation II. A yellow fugitive tint is obtained.

EXAMPLE V

The procedure of Example I is repeated using the diazonium salt of 4,4' diaminostilbene-2,2' disulfonic acid and the compound prepared according to Preparation II. A reddish orange fugitive tint is obtained.

EXAMPLE VI

The procedure of Example I is repeated employing the diazonium salt of 4,4' diaminostilbene-2,2' disulfonic acid and the compound prepared according to Preparation III. A reddish orange fugitive tint is obtained.

EXAMPLE VII

The procedure of Example I is repeated using the diazonium salt of 1,8 naphtholamine-3-6 disulfonic acid and the compound prepared according to Preparation III. A red fugitive tint is obtained.

EXAMPLE VIII

The procedures of Preparation I and Example I are repeated using 75 molar equivalents of ethylene oxide and 25 molar equivalents of propylene oxide with the diazonium salt of aniline 2,5 disulfonic acid. A yellow fugitive tint is obtained.

EXAMPLE IX

The procedures of Preparation I and Example I are repeated using 15 molar equivalents each of ethylene oxide and propylene oxide with the diazonium salt of aniline 2,5 disulfonic acid. A yellow fugitive tint is obtained.

EXAMPLE X

One hundred eleven pounds of a compound prepared according to Preparation II are condensed with two pounds of o-formyl benzene sulfonic acid in 113 pounds of water containing small amounts of urea and concentrated hydrochloric acid. The resulting product is oxidized with hydrogen peroxide in the presence of ammonium meta vanadate to form a blue fugitive tint.

EXAMPLE XI

The procedure of Example X is repeated using the compound prepared according to the procedure of Preparation I and o-formyl benzene sulfonic acid. A green fugitive tint is obtained.

EXAMPLE XII

The procedures of Preparation I and Example X are repeated using 25 molar equivalents each of ethylene oxide and propylene oxide with N,N dimethyl p-aminobenzaldehyde. A blue fugitive tint is obtained.

EXAMPLE XIII

The procedures of Preparation II and Example X are repeated using 60 molar equivalents of ethylene oxide and 40 molar equivalents of propylene oxide with o-formyl benzene sulfonic acid. A blue fugitive tint is obtained.

EXAMPLE XIV

The procedures of Preparation II and Example X are repeated using 40 molar equivalents of ethylene oxide and 60 molar equivalents of propylene oxide with o-formyl benzene sulfonic acid. A blue fugitive tint is obtained.

The tints prepared in Examples I through XIV are applied to textile fibers or textile fabrics by padding, spraying, or printing from either aqueous or solvent solutions containing 1 to 5% of the respective tint. The fibers or textile fabrics may consist of polyester fibers, nylon 66 fibers, acrylic or modacrylic fibers or wool fibers or other natural or synthetic fibers. The tints are easily and completely removed by either of the following procedures:
  1. Scouring in an aqueous solution containing approximately 0.5% of a conventional detergent at a temperature preferably above 50° C. for about 15 minutes or
  2. Scouring at room temperature in a drycleaning agent such as tetrachloroethylene or by processing the goods through a normal cycle in commercial drycleaning equipment.

The above description shows that the present invention provides a novel tint which not only is fugitive with aqueous solutions but also with non-polar solvents and particularly non-polar chlorinated solvents such as tetrachloroethylene. Furthermore, the tints of the invention can be easily and completely removed from substantially all textile fibers by the conventional aqueous or solvent scouring operations commonly used in fabric finishing.

It will be apparent that modifications and variations in the specific procedures described above may be made within the scope of the invention. For example, the amounts and relative proportions of the oxides may be changed to meet particular requirements. Therefore, the invention is to be limited only by the following claims.

Having thus described the invention, we claim:

1. A water-soluble, non-polar solvent-soluble fugitive tint having the formula $$R[(\text{ethyleneoxy})_n(\text{propyleneoxy})_m]_x$$

wherein R is an organic dyestuff radical, [(ethyleneoxy)$_n$(propyleneoxy)$_m$] is a polymer constituent formed by polymerizing $n$ moles of ethylene oxide and $m$ moles of propylene oxide, $x$ is from 1 to 6, said polymer constituent containing from 40 to about 60 mole percent ethyleneoxy units, and the product of $(n + m)_x$ is from 30 to about 200.

2. A tint according to claim 1 wherein said organic dyestuff radical contains an amino nitrogen and two of said polymer constituents are coupled to said amino nitrogen, said polymer constituents containing a total of from about 75 to 150 oxy units.

3. A tint according to claim 1 wherein said dyestuff radical is an azo dyestuff radical.

4. A tint according to claim 1 wherein said dyestuff radical is a triarylmethane dyestuff radical.

5. A tint according to claim 1 wherein said dyestuff radical contains at least one sulfonic acid radical.

6. A tint according to claim 1 wherein said dyestuff radical contains at least one sulfonic acid salt radical.

7. A water-soluble, non-polar solvent-soluble fugitive tint having the formula $$R\text{-N-}[(\text{ethyleneoxy})_n(\text{propyleneoxy})_m]_2H$$

wherein R is an organic dyestuff radical (ethyleneoxy)$_n$(propyleneoxy)$_m$ is a polymer formed by polymerizing $n$ moles of ethylene oxide and $m$ moles of propylene oxide and the product $2(n + m)$ is 100.

* * * * *